United States Patent [19]

Beck

[11] Patent Number: 4,723,640

[45] Date of Patent: Feb. 9, 1988

[54] ADJUSTABLE HYDRAULIC VIBRATION DAMPER

[75] Inventor: Hubert Beck, Eitorf, Fed. Rep. of Germany

[73] Assignee: Boge GmbH, Eitorf, Fed. Rep. of Germany

[21] Appl. No.: 864,451

[22] Filed: May 16, 1986

[30] Foreign Application Priority Data

May 22, 1985 [DE] Fed. Rep. of Germany ....... 3518327

[51] Int. Cl.$^4$ ............................................. F16F 9/348
[52] U.S. Cl. ................................. 188/319; 137/614.2; 137/614.21; 188/280; 251/129.15; 280/707; 280/714
[58] Field of Search ............... 188/280, 285, 299, 319, 188/322.13, 322.14, 322.15; 280/707, 714; 137/614.2, 614.21; 251/129.15

[56] References Cited

U.S. PATENT DOCUMENTS

| | | | |
|---|---|---|---|
| 2,264,111 | 11/1941 | Briggs | 188/280 X |
| 2,934,175 | 4/1960 | Schnitzer | 188/280 |
| 3,991,659 | 11/1976 | Robinson | 188/317 X |
| 4,313,529 | 2/1982 | Kato et al. | 188/299 |
| 4,352,417 | 10/1982 | Stinson | 188/322.15 |
| 4,535,877 | 8/1985 | Shimokura | 137/614.2 X |
| 4,600,215 | 7/1986 | Kuroki et al. | 280/707 |
| 4,615,420 | 10/1986 | Mourray | 188/322.15 |

FOREIGN PATENT DOCUMENTS

| | | |
|---|---|---|
| 2413833 | 9/1975 | Fed. Rep. of Germany ...... 188/317 |
| 2911768 | 1/1983 | Fed. Rep. of Germany . |
| 3303293 | 1/1984 | Fed. Rep. of Germany . |
| 197638 | 11/1984 | Japan ................................. 188/299 |
| 2,143,390 | 2/1985 | United Kingdom ................ 188/319 |

*Primary Examiner*—George E. A. Halvosa
*Attorney, Agent, or Firm*—Nils H. Ljungman

[57] ABSTRACT

Hydraulic adjustable vibration damper with a damping piston, which divides the work cylinder into two chamber halves, whereby the two chamber halves are connected with one another by a bypass, in which an electromagnet controls the bypass. The bypass valve located in the bypass includes an axially-movable valve body which works together with a passage and which is controlled by the adjustment apparatus, and at least one spring-loaded valve which operates as a function of the pressure connected in series with the valve body.

14 Claims, 8 Drawing Figures

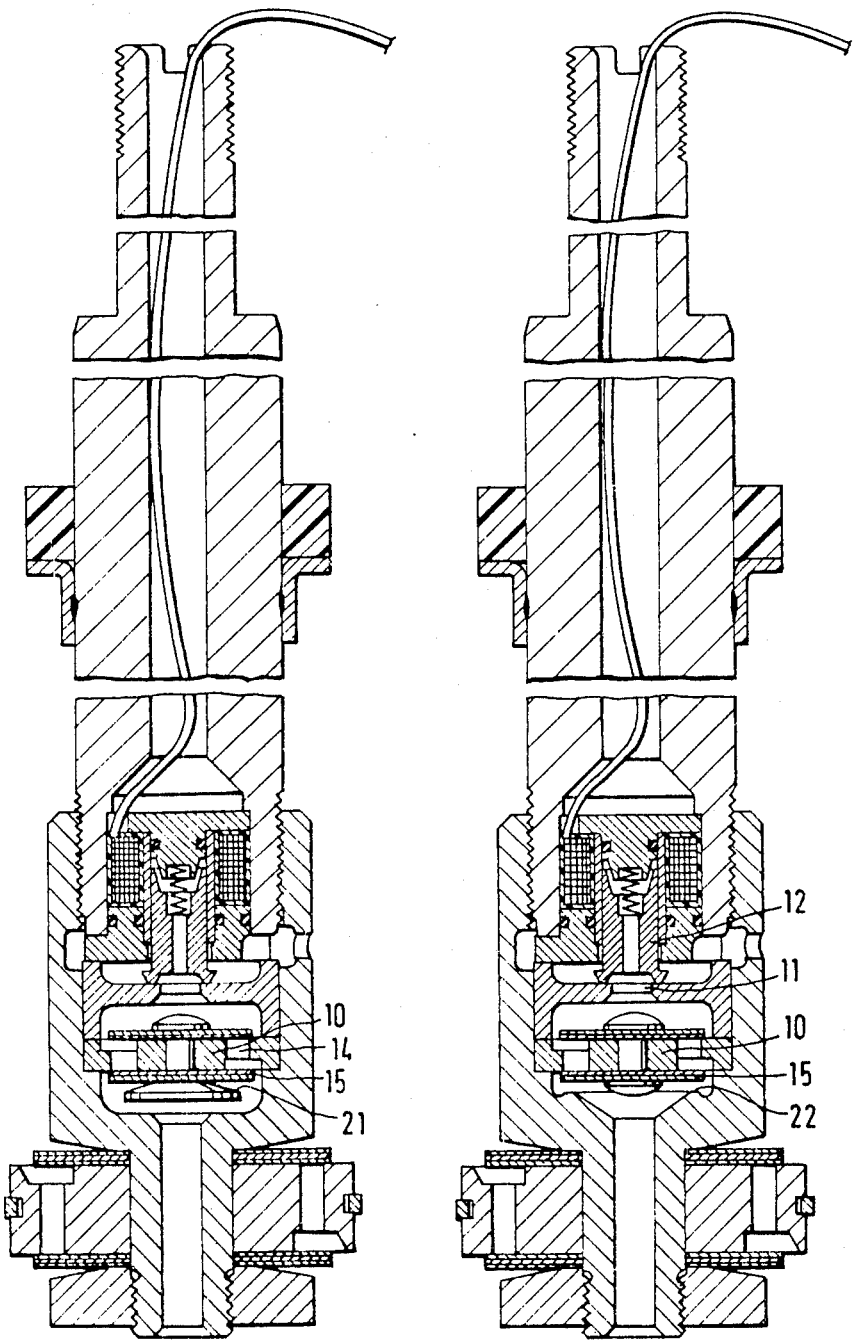

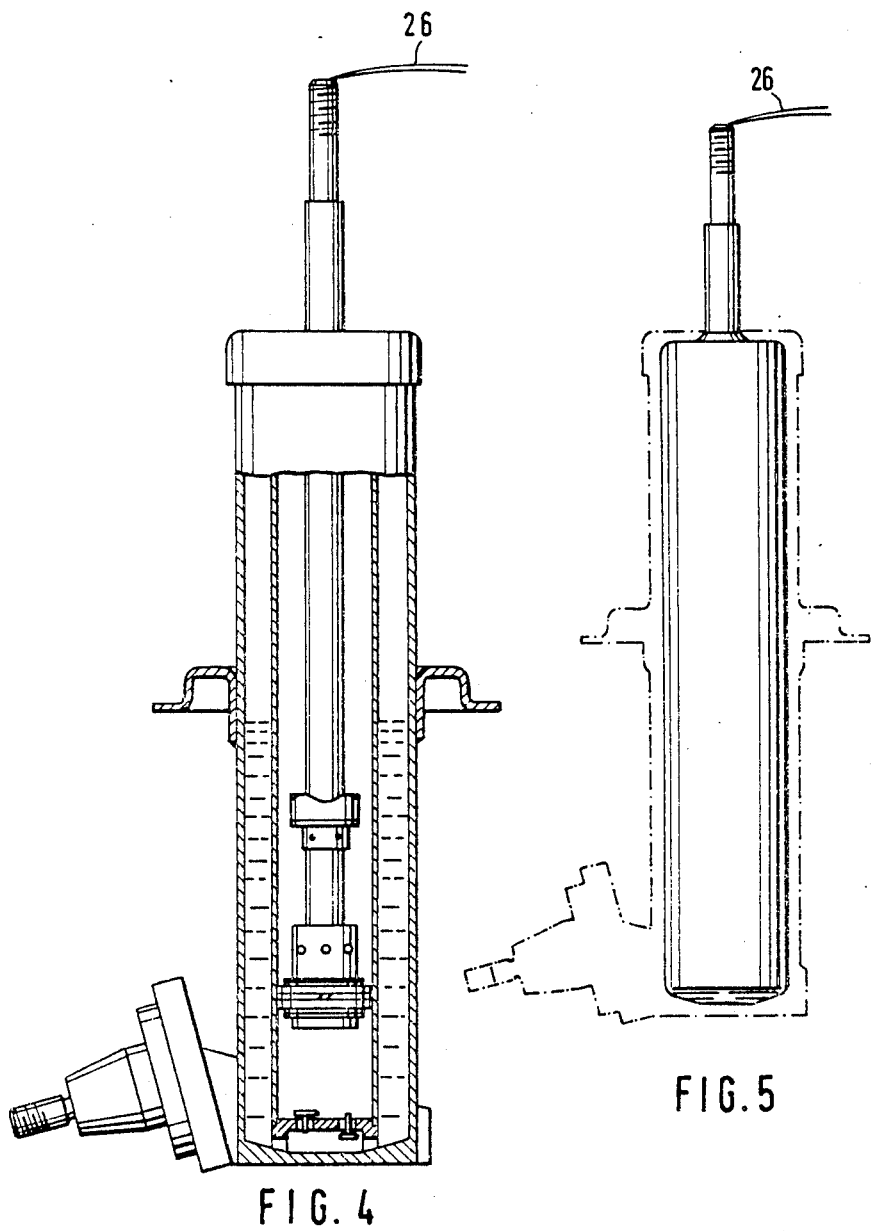

ADJUSTABLE HYDRAULIC VIBRATION DAMPER

BACKGROUND OF THE INVENTION

1. Field of the Invention

The present invention relates to vibration dampers and, more particularly, to adjustable hydraulic vibration dampers.

The hydraulic adjustable vibration dampers have a damping piston fastened to a piston rod, which divides the work cylinder into two chamber halves filled with damping fluid. A bypass, formed by a transverse boring located above the damping piston and a longitudinal boring at least in the termal region of the piston rod, connects the upper half of the chamber with the lower half of the chamber. There is an axially-movable adjustment apparatus to adjust the damping force connected with an electromagnet, consisting of a coil and armature, to control the bypass.

2. Description of the Prior Art

Federal Republic of Germany Laid Open Patent Application No. DE-OS No. 33 03 293 describes damping force regulation devices for telescoping shock absorbers on which there is an additional double-acting damping valve, which is incorporated into the damping piston itself. These damping valves are connected in series and can be separated from one another by means of a rotary disc valve. In a first valve position, only the valve of the damping piston is carrying a flow, so that a mild damping action can be achieved. In a second valve position, the valve in the damping piston and the additional valve both carry flows, so that a correspondingly hard damping characteristic can be achieved.

A disadvantage with such an embodiment is that the rotary disc valve must be pressurized by appropriate adjustment forces, which can only be applied by slow-acting drives, such as pneumatically or hydraulically driven positioning mechanisms, or an electrically-driven positioning motor.

In Federal Republic of Germany Patent No. DE-PS 29 11 768, there are described adjustable shock absorbers in which there is a coil in the upper part of the piston rod and in which an armature can move axially. As a function of the current fed to the coil, a specified bypass opening can be created between the upper and lower work chamber. A disadvantage with this arrangement is that, by controlling a change in the cross section, it is not possible to achieve an optimal damping force characteristic. The cross section modification which can be achieved corresponds to the regularities of a simple throttle hole, whereby with increasing piston velocities, an undesirable progressive damping characteristic always takes over. Both of the above-mentioned Federal Republic of Germany Patent Publications are incorporated herein by reference as if they were set forth herein in their entirety.

OBJECTS OF THE INVENTION

An object of the invention is to create, inside the piston rod of a vibration damper, an apparatus for the variable adjustment of the damping, in which, by means of a variably controllable damping valve, any desired degree of damping in the decompression and compression phases can be attained.

A further object of the invention is to use as many standard parts as possible.

A yet further object of the invention is to incorporate the invention in a replaceable strut cartridge.

SUMMARY OF THE INVENTION

These objectives are achieved by the invention in that the bypass valve in the bypass consists of an axially-movable valve body which interacts with a passage and which can be controlled by the adjustment apparatus, and at least one pressure-dependent spring-loaded valve arranged in series with the valve body.

An advantage with this solution is that the bypass operates parallel to the conventional throttle valves in the damping piston. By means of the axially-moving controllable valve body, the bypass valve can be positioned with the valves of the damping piston, so that there is a larger overall passage, which causes a correspondingly reduced throttle action, that is, damping. In this manner, different damping characteristics with the required extensive variability can be produced.

One important feature of an embodiment of the invention is that the spring-loaded valve consists of throttle borings and the valve spring washers which close the throttle borings. One advantage is that there are separate throttle holes and valve spring washers for the decompression and compression phase.

In another embodiment of the invention, the bypass between the transverse boring and the longitudinal boring exhibits two cavities connected with one another via a passage, whereby the electromagnet and the adjustment apparatus controlling the passage are located in the first cavity, and the spring-loaded valve is located in the second cavity.

A simple and economical embodiment is achieved by making the first cavity a component of the piston rod and the second cavity a component of an intermediate sleeve connected with the piston rod and holding the damping piston.

An additional variability of the damping force characteristic is achieved if, as in one embodiment of the invention, the passage and the valve body exhibit a cross section corresponding to a throttle.

To make certain that, in case of failure of the bypass valve control, the tighter and thus safer damping characteristic is assured, another characteristic of the invention provides that the valve body be pressurized by a spring so that it closes the passage when no current is fed to the coil. Thus, the bypass valve, which makes the ride more comfortable but which cannot be operated for long periods of time in extreme cases, is mechanically excluded from the circuit.

A preferred embodiment of the invention provides that the spring-loaded valve is designed as a spring washer valve, or comprises at least one spring washer and at least one helical spring. In addition, the spring-loaded valve can also comprise a plate and at least one helical spring.

In one embodiment of the invention, the spring-loaded valve can exhibit a continuously-open, constant throttle cross section, which acts on the damping force in the lower piston velocity range.

In another advantageous embodiment of the invention, the spring-loaded valve exhibits at least one stop which limits the movement of the valve spring washers, or the spring-loaded valve exhibits at least one other valve seat which limits the movement of the valve spring washer, whereby the valve spring washer closes the flow connection after a defined excursion of the valve spring washer.

To achieve a soft damping action, another important variant has the spring-loaded valve located in the bypass connected hydraulically in parallel to the valves located in the damping piston. By switching the bypass valve, a parallel flow connection is thereby created.

BRIEF DESCRIPTION OF THE DRAWINGS

The above, as well as other features and advantages of the present invention, can be more readily appreciated through consideration of the detailed description of preferred embodiments in conjunction with the drawings, in which:

FIG. 2 shows another embodiment of a vibration damper, in cross section;

FIG. 3 shows a variant of the spring-loaded valve, also in cross section;

FIG. 4 shows a two-tube shock absorber strut, in cross section;

FIG. 5 shows a shock absorber strut cartridge for use in a shock absorber strut, in a plan view;

DESCRIPTION OF PREFERRED EMBODIMENTS OF THE INVENTION

Figure 1:
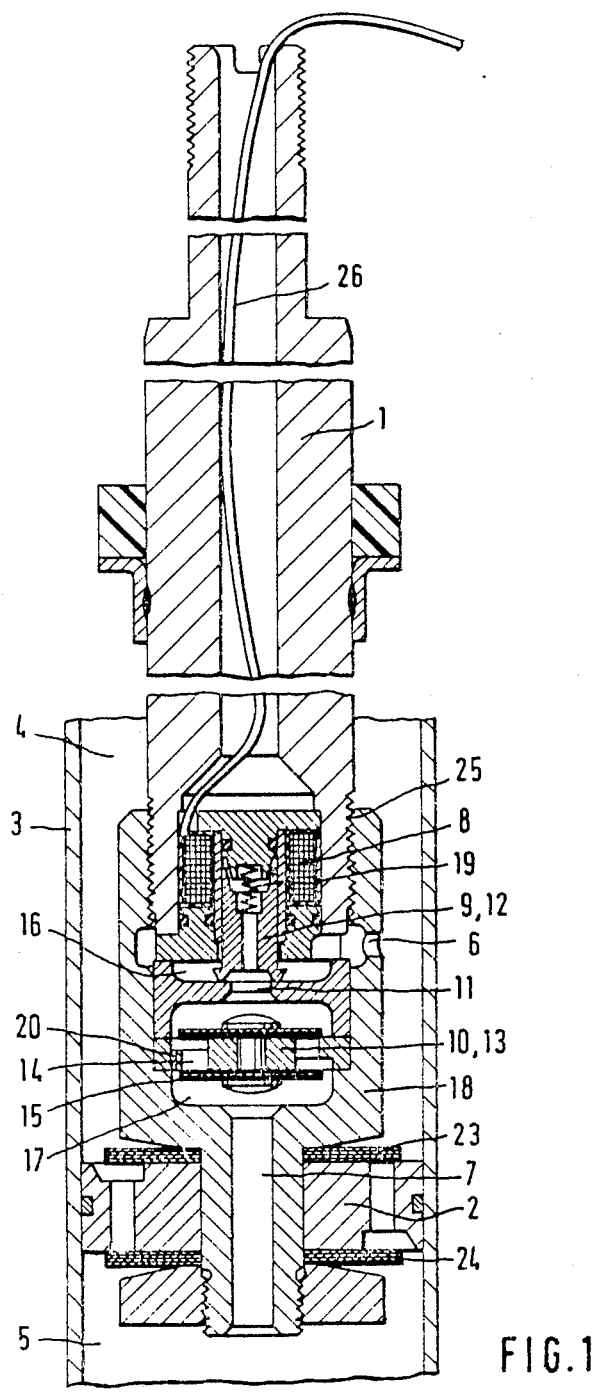
FIG. 1 shows a vibration damper, in cross section.

The vibration damper illustrated in FIG. 1 consists essentially of a piston rod 1 and a damping piston 2, which divides a work cylinder 3 into an upper chamber half 4 and a lower chamber half 5. The damping piston 2 is equipped with valves 23 and 24, for the production of a damping force.

The upper chamber half 4 is also connected via a bypass connection with the lower chamber half 5. This bypass connection comprises a transverse boring 6 and a longitudinal boring 7. Inside this bypass connection, a passage 11 is pressurized by a valve body 12, whereby the valve body 12 is a component of an electromagnet comprising a coil 8 and an armature 9. The valve body 12 is thereby configured directly as the armature 9 and housed in a cavity 16. Moreover, there is a bypass valve 10 behind the passage 11 in the bypass connection. The bypass valve 10 is located in a cavity 17 and comprises throttle borings 14, which are controlled by valve spring washers 15, so that a spring-loaded valve 13 exercises full control of the bypass as a function of the pressure. For the low range of piston velocities, the spring-loaded valve 13 also exhibits a constant throttle opening 20.

To simplify fabrication and installation, the coil 8 and the armature 9 are located in the end region of the piston rod 1, whereby the bypass valve 10, together with a plate containing the passage 11, is a component of an intermediate sleeve 18, which is connected with the piston rod 1 by means of a threaded connection 25. The electrical feed 26 runs through a hole in the piston rod 1.

This embodiment makes possible assembly by groups of components, whereby the bypass control and the bypass valve itself is a component of the piston rod 1, so that, where necessary for a mass-produced vibration damper, for a one-tube or two-tube damper and for a shock absorber strut cartridge, not only is installation easy, but so is any subsequent replacement which may be necessary.

A helical spring 19 is disposed between the valve body 12 and the base of the electromagnet keeps the passage 11 closed when no current is fed to the coil 8, so that, if the electromagnet should fail, the damper automatically assumes the tighter setting.

FIG. 2 illustrates an embodiment in which the bypass valve 10 is also designed as a spring-loaded valve, and throttle borings 14 are opened and closed by valve spring washers 15. This spring-loaded valve 10 also exhibits a stop 21, which limits the axial travel of the valve spring washer 15. In the decompression phase, in this embodiment, a defined opening cross-section is established above a specified pressure.

In FIG. 3, the bypass valve 10 has a second valve seat 22, with which the valve spring washers 15 come into contact above a specified pressure, so that the bypass is again closed above this pressure, so that when the passage 11 is opened by the valve body 12, the bypass connection is again closed. As soon as the pressure in the decompression phase drops, the bypass connection is re-established automatically.

FIG. 4 shows one application of the bypass valve in a twotube shock absorber strut, whereby an electrical feed 26 is the only element which has to be introduced externally. Embodiments of the invention can thereby be used in a shock absorber strut cartridge as a replacement for a shock absorber strut. Because of the components located inside it and the fact that there is only one element which has to be introduced from the outside, namely the electrical feed 26, the replacement of the entire cartridge is possible without any additional expense, as illustrated in FIG. 5.

Figure 6:
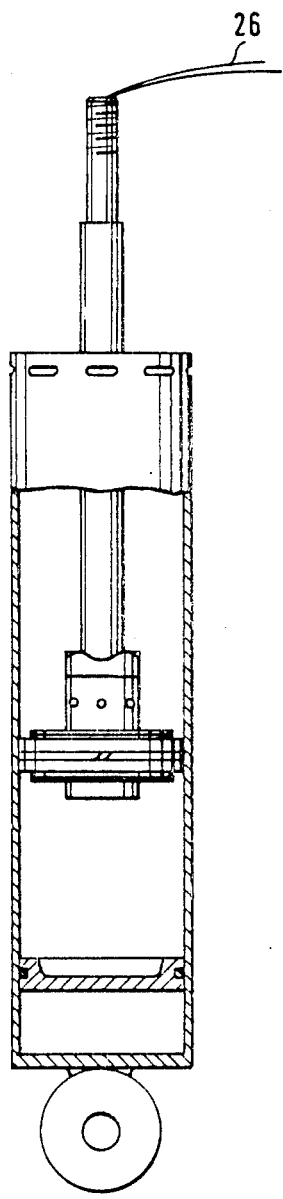
FIG. 6 shows a one-tube gas pressure damper, in cross section.
Figure 7:
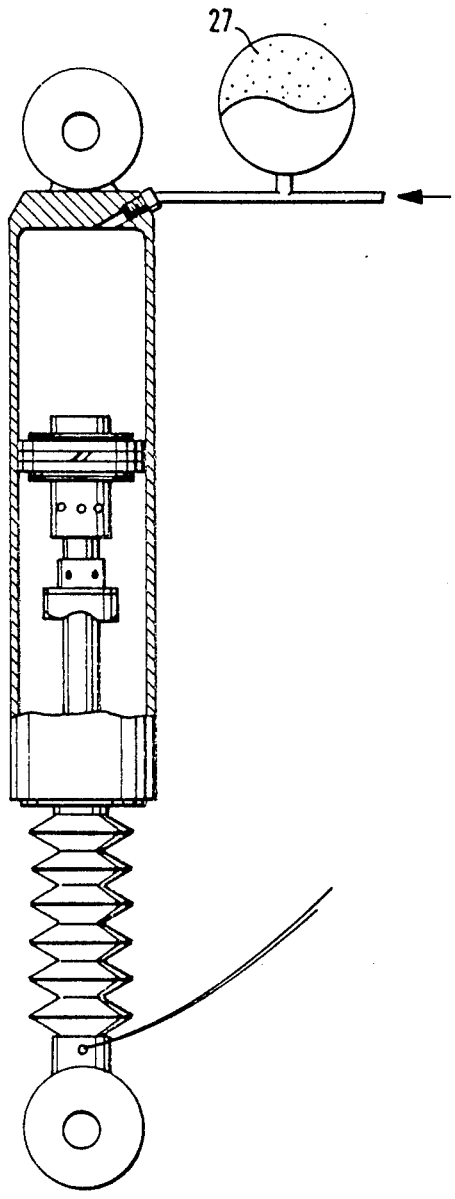
FIG. 7 shows a one-tube damper with an external gas reservoir for use in a level regulating installation, in cross section.
Figure 8:
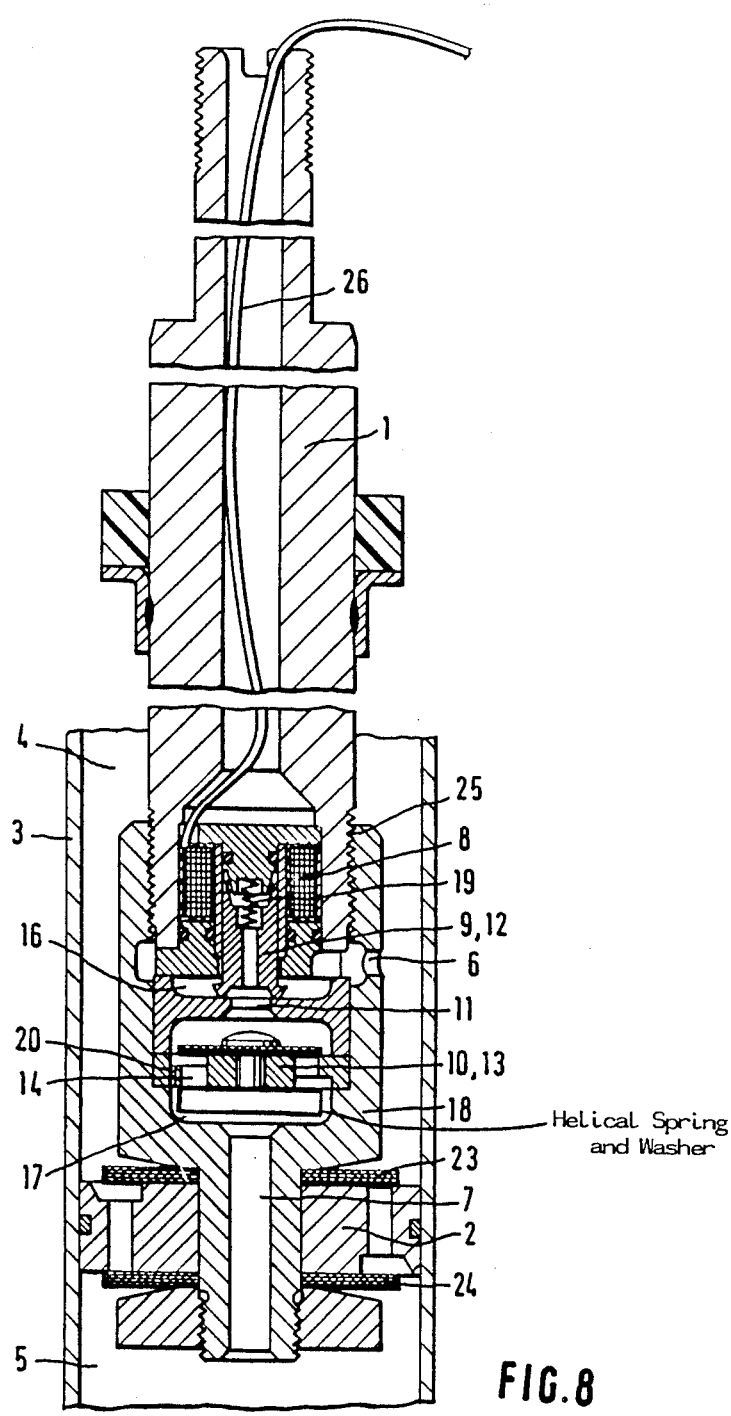
FIG. 8 shows an embodiment of the invention wherein a biased spring valve consists of a helical spring and a washer.

The system can be easily used in a one-tube gas pressure damper, as shown in FIG. 6, and also in the embodiment illustrated in FIG. 7, in which a gas pressure reservoir 27 is located outside the work cylinder. In each case, the electrical feed 26 is the only external component.

The invention as described hereinabove in the context of preferred embodiments is not to be taken as limited to all of the provided details thereof, since modifications and variations thereof may be made without departing from the spirit and scope of the invention.

What is claimed is:

1. A hydraulic vibration damper with adjustable damping with a hydraulic cylinder filled with damping fluid, said vibration damper having piston means comprising a piston fastened to a piston rod, said piston means being disposed in said hydraulic cylinder, said piston dividing said cylinder into two chambers, said piston rod having a longitudinal axis;

bypass means disposed to bypass damping fluid through said piston means;

said bypass means having disposed, hydraulically in series, therein pressure dependent, biased valve means and electromagnetically-controlled valve means;

said electromagnetically-controlled valve means comprising an orifice and a movable body, said body being disposed for opening and closing said orifice during an adjusting operation of said vibration damper, said electromagnetically-controlled valve means providing the sole fluid communication between said two chambers for fluid flowing through said pressure dependent, biased valve means; and means for electrically connecting said electromagnetically-controlled valve means to an external power source, whereby a damping force of said vibration damper is externally adjustable by energization of said electromagnetically-controlled valve means;

said pressure-dependent, biased valve means comprising spring-loaded valve means, said spring-loaded valve means having at least one throttle opening and at least one valve spring washer being biased and disposed such that said at least one throttle opening is normally in a first, closed seated position at no pressure difference thereacross;

said spring-loaded valve means comprises at least one other valve seat for limiting opening movement of said valve spring washer and for closing said valve spring washer thereagainst for stopping flow through said bypass means after said valve spring washer has made a predetermined excursion under pressure, said valve spring washer being bendable from said first seated position to a second seated position against said at least one other valve seat on over pressure.

2. The vibration damper according to claim 1, wherein said at least one throttle opening and said at least one valve spring washer are disposed to open at given pressures during decompression and compression of said vibration damper.

3. The vibration damper according to claim 2, wherein said bypass means further comprises, in series with said pressure-dependent, biased valve means and said electromagnetically-controlled valve means, at least one first opening having a longitudinal axis disposed transversely to said piston rod longitudinal axis and a second opening having a longitudinal axis aligned with said piston rod longitudinal axis, and further comprising two cavities for being hydraulically connected to one another by said orifice, and wherein said body has a longitudinal axis which is aligned with said piston rod longitudinal axis and disposed to move back and forth as said electromagnetically-controlled valve means is energized and de-energized.

4. The vibration damper according to claim 1, wherein said bypass means further comprises, in series with said pressure-dependent, biased valve means and said electromagnetically-controlled valve means, at least one first opening having a longitudinal axis disposed transversely to said piston rod longitudinal axis and a second opening having a longitudinal axis substantially aligned with said piston rod longitudinal axis, and further comprising two cavities for being hydraulically connected to one another by said orifice, and wherein said body has a longitudinal axis which is substantially aligned with said piston rod longitudinal axis and disposed to move back and forth as said electromagnetically-controlled valve means is energized and de-energized.

5. The vibration damper according to claim 4, wherein said electromagnetically-controlled valve means is disposed in a first of said two cavities and said spring-loaded valve is disposed in a second of said two cavities.

6. The vibration damper according to claim 5, wherein said first cavity is disposed in a first portion of said piston rod and said second cavity is disposed in a second portion of said piston rod, said second portion of said piston rod comprising an intermediate sleeve for holding and connecting said piston rod with said piston.

7. The vibration damper according to claim 6, including at least one bypass valve disposed in said piston for hydraulically bypassing damping fluid between said two chambers in addition to fluid bypassed by said bypass means.

8. The vibration damper according to claim 1, wherein said bypass means further comprises, in series with said pressure-dependent, biased valve means and said electromagnetically-controlled valve means, at least one first opening having a longitudinal axis disposed transversely to said piston rod longitudinal axis and a second opening having a longitudinal axis aligned with said piston rod longitudinal axis, and further comprising two cavities for being hydraulically connected to one another by said orifice, and wherein said body has a longitudinal axis which is aligned with said piston rod longitudinal axis and disposed to move back and forth as said electromagnetically-controlled valve means is energized and de-energized.

9. The vibration damper according to claim 1, wherein said body is disposed, in operation, such as to permit flow through said orifice when said electromagnetically-controlled valve means is energized.

10. The vibration damper according to claim 1, including a spring or biasing said body in a closed position against said orifice when said electromagnetically-controlled valve means is de-energized, whereby damping of said vibration damper is maximized when said electromagnetically-controlled valve means is de-energized.

11. The vibration damper according to claim 1, wherein said biased valve means comprises spring-loaded valve means, and wherein said spring-loaded valve means comprises at least one spring washer and at least one helical spring.

12. The vibration damper according to claim 1, wherein said biased valve means comprises spring-loaded valve means, and wherein said spring-loaded valve means comprises a washer and at least one helical spring.

13. The vibration damper according to claim 1, wherein said biased valve means includes at least one continuously open constant throttle cross-section means.

14. The vibration damper according to claim 1, including at least one bypass valve disposed in said piston for hydraulically bypassing damping fluid between said two chambers in addition to fluid bypassed by said bypass means.

* * * * *